INVENTOR.
HANS A. RASS,
BY
McMorrow, Berman & Davidson
ATTORNEYS.

March 3, 1964  H. A. RASS  3,123,172
SHOCK ABSORBING SUSPENSION LINKAGE FOR A VEHICLE WHEEL
Filed July 27, 1962  4 Sheets-Sheet 2
FIG. 3.
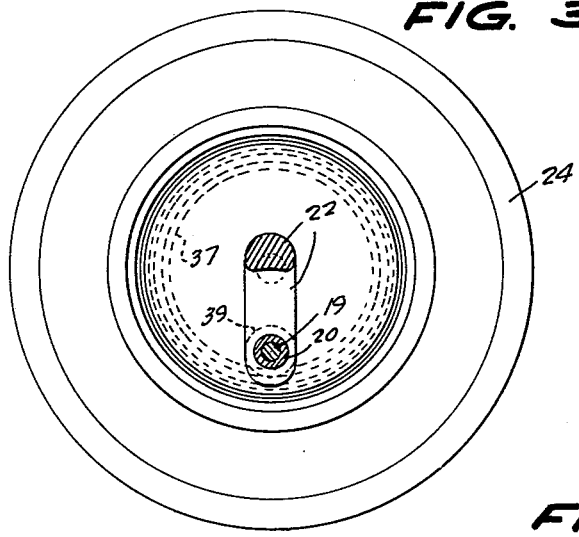
FIG. 4.
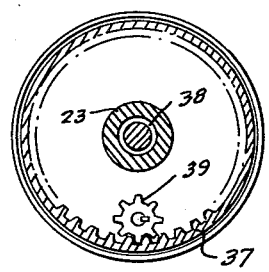
FIG. 5.
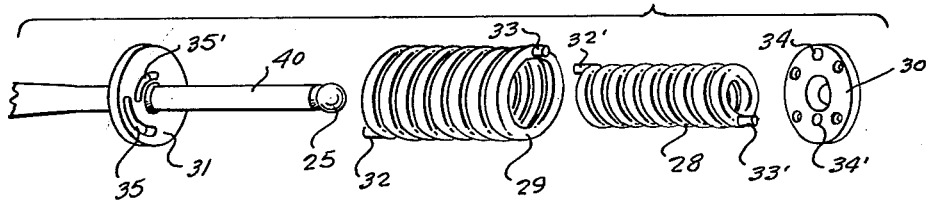
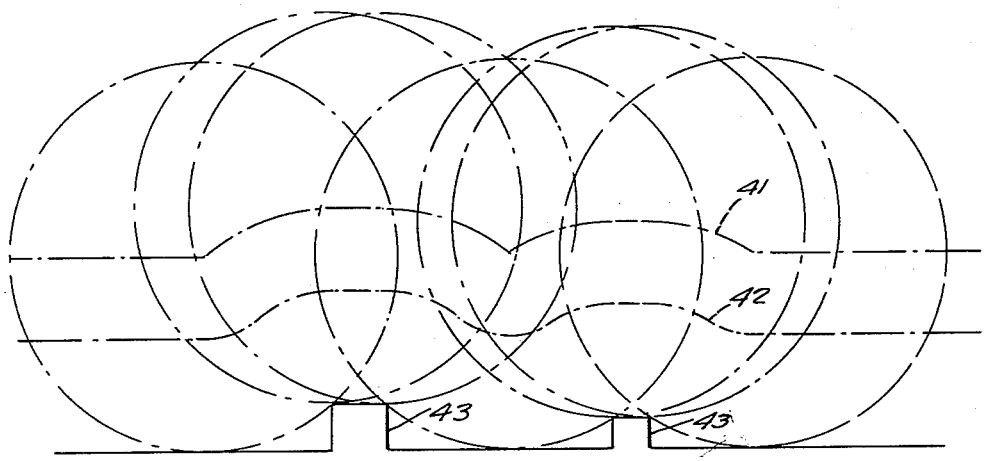
FIG. 6.
INVENTOR.
HANS A. RASS,
BY
McMorrow, Berman + Davidson
ATTORNEYS.

March 3, 1964    H. A. RASS    3,123,172
SHOCK ABSORBING SUSPENSION LINKAGE FOR A VEHICLE WHEEL
Filed July 27, 1962    4 Sheets-Sheet 3
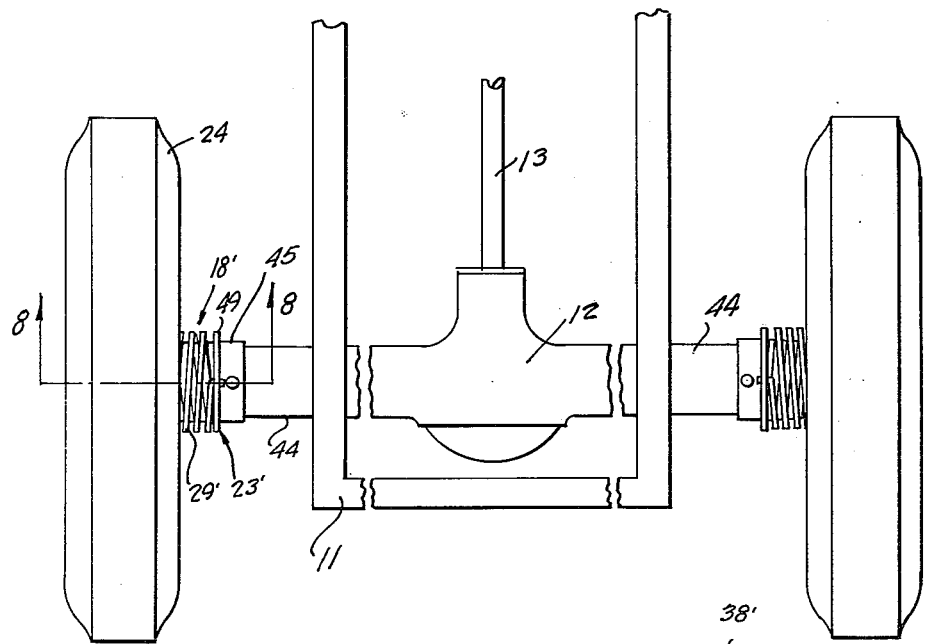
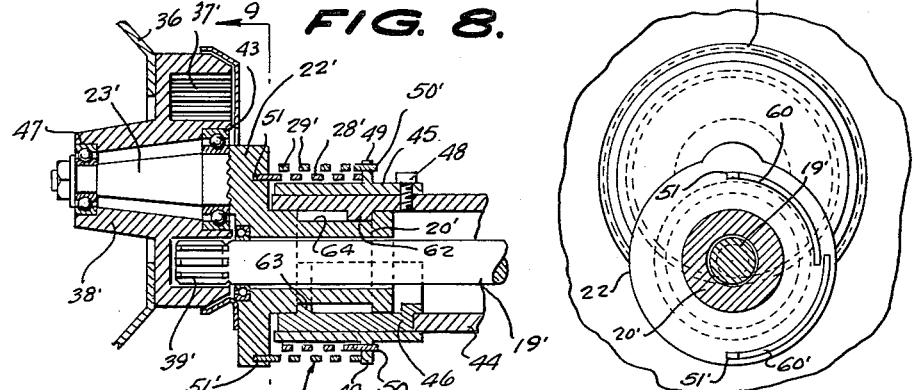
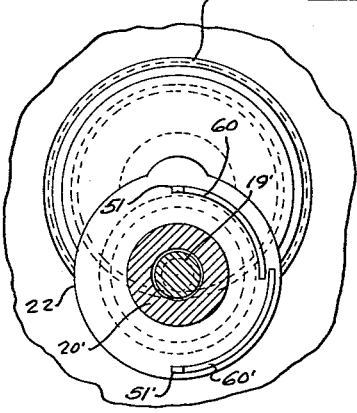
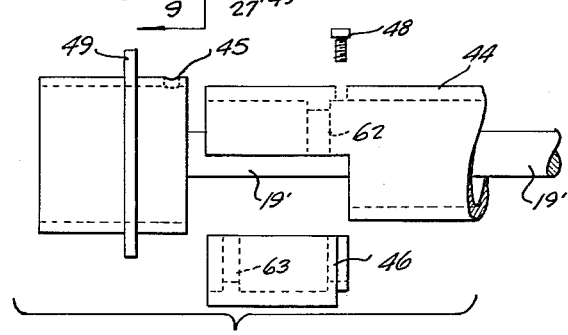
INVENTOR.
HANS A. RASS,
BY
McMorrow, Berman + Davidson
ATTORNEYS.

March 3, 1964 H. A. RASS 3,123,172
SHOCK ABSORBING SUSPENSION LINKAGE FOR A VEHICLE WHEEL
Filed July 27, 1962 4 Sheets-Sheet 4
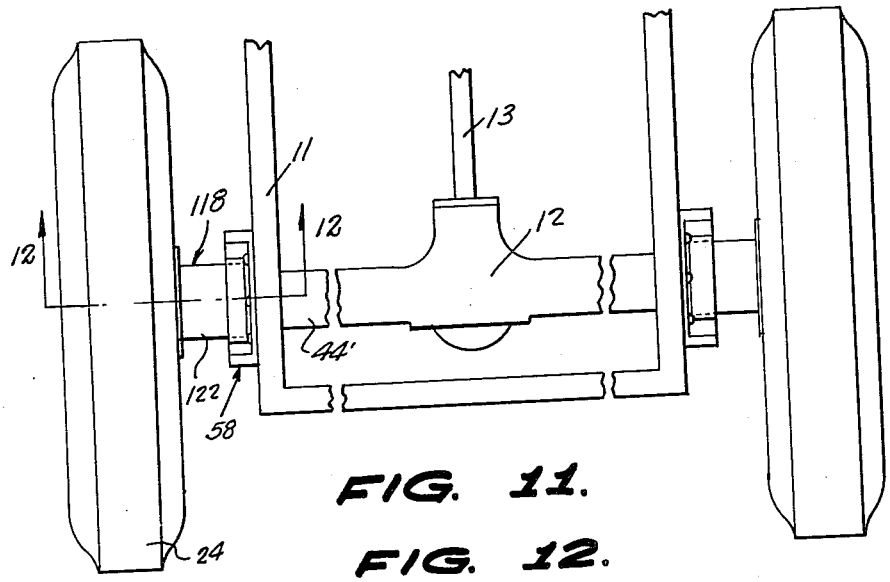
FIG. 11.
FIG. 12.
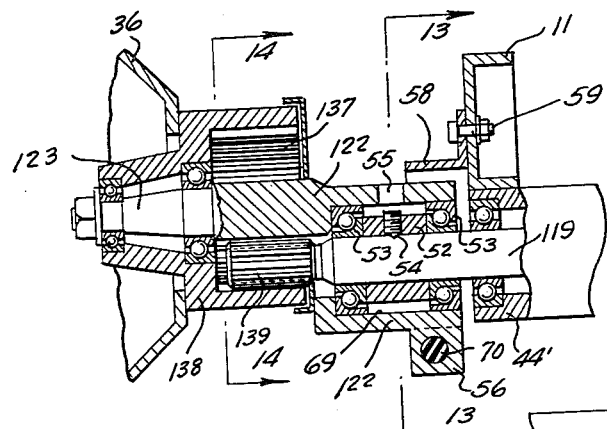
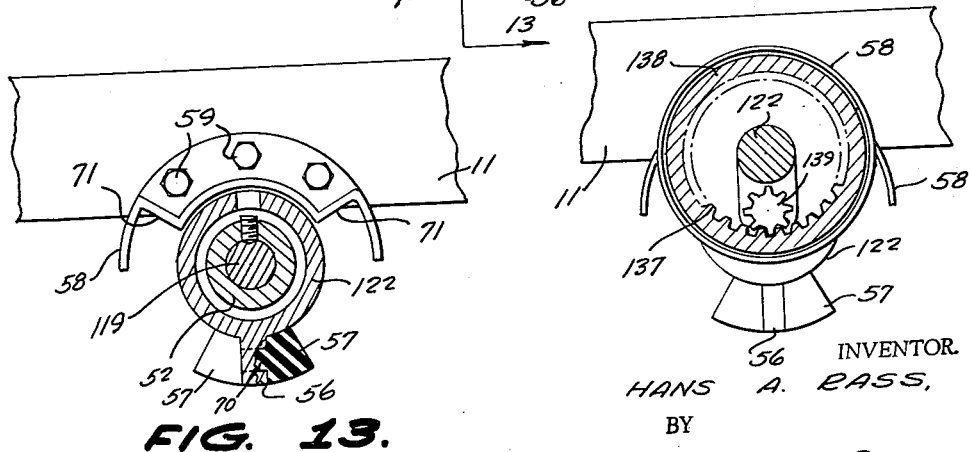
FIG. 14.
FIG. 13.
INVENTOR.
HANS A. RASS,
BY
McMorrow, Berman + Davidson
ATTORNEYS.

_United States Patent Office_

3,123,172
Patented Mar. 3, 1964

3,123,172
SHOCK ABSORBING SUSPENSION LINKAGE
FOR A VEHICLE WHEEL
Hans A. Rass, 303 St. Lawrence, Beloit, Wis.
Filed July 27, 1962, Ser. No. 212,895
3 Claims. (Cl. 180—73)

This invention relates to shock absorbing wheel mounting assemblies, and more particularly to a shock absorbing suspension linkage adapted to be employed in supporting a load on one or more ground-engaging wheels.

A main object of the invention is to provide a novel and improved shock absorbing assembly for use in connecting a load-supporting member to a driven ground-engaging wheel, the assembly being relatively simple in construction, involving simple parts, being easy to assemble, and being of general usefulness in conjunction with absorbing shocks between a load-supporting member and a driven supporting wheel.

A further object of the invention is to provide a new and improved shock absorbing connection between a load-supporting frame and a driven ground-engaging wheel, the connection being arranged so that the wheel is allowed to swing relative to the frame, whereby irregularities in the ground tend to cause the wheel to swing relative to the frame rather than to cause shocks to be transmitted directly to the frame, and whereby the assembly maintains a driving linkage to the wheel in any position the wheel takes, the assembly involving inexpensive components, being durable in construction, and being applicable to a wide range of load-supporting devices, including transport vehicles of all kinds.

Further objects and advantages of the invention will become apparent from the following description and claims, and from the accompanying drawings, wherein:

FIGURE 3 is a transverse vertical cross sectional view taken substantially on the line 3—3 of FIGURE 2.

FIGURE 4 is a transverse vertical cross sectional view taken substantially on the line 4—4 of FIGURE 2.

FIGURE 5 is a fragmentary exploded view showing one of the stabilizer assemblies employed in the shock absorbing arrangement of FIGURE 1.

FIGURE 6 is a diagram illustrating the path of movement of a wheel in an assembly constructed according to the present invention as the wheel passes over obstacles, and further illustrating the restricted paths of movement of the wheel axis and the point of connection of the vehicle frame to the shock absorbing assembly.

FIGURE 7 is a top plan view showing a modified form of the present invention, wherein most of the moving parts are housed.

FIGURE 8 is an enlarged partial vertical cross sectional view taken substantially on the line 8—8 of FIGURE 7.

FIGURE 9 is a transverse vertical cross sectional view taken substantially on the line 9—9 of FIGURE 8.

FIGURE 10 is an exploded front elevational view of the axle and associated elements shown in FIGURE 8.

FIGURE 11 is a top plan view showing another modified form of the present invention, wherein the stabilizer assembly is replaced by a swinging stop member and a stop bracket cooperating therewith.

FIGURE 12 is an enlarged partial vertical cross sectional view taken substantially on the line 12—12 of FIGURE 11.

FIGURE 13 is a transverse vertical cross sectional view taken substantially on the line 13—13 of FIGURE 12.

FIGURE 14 is a transverse vertical cross sectional view taken substantially on the line 14—14 of FIGURE 12.

Figures 1, 2:
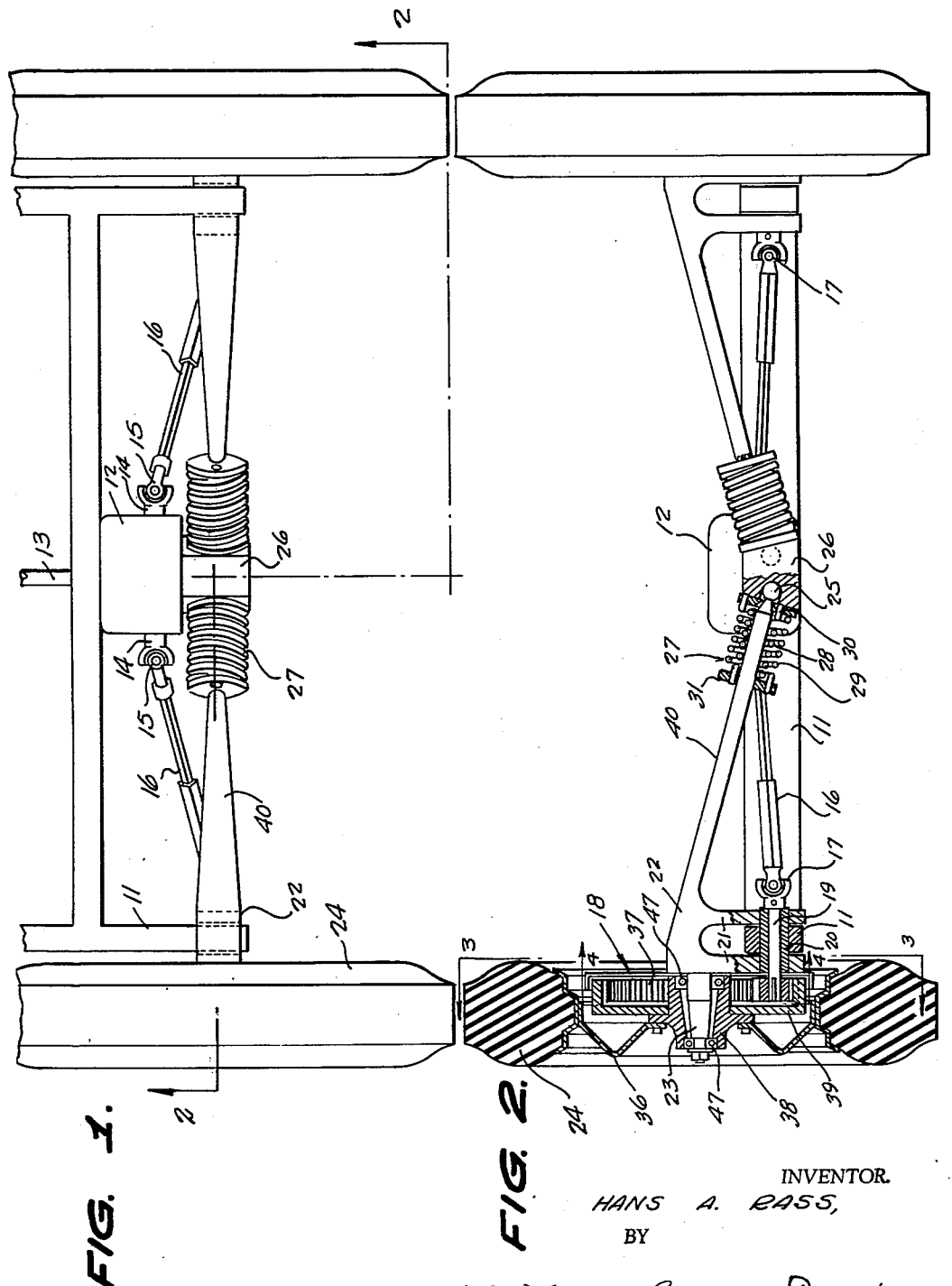
FIGURE 1 is a top view of two wheels connected to a vehicle frame and driving mechanism by an improved shock absorbing assembly constructed in accordance with the present invention.
FIGURE 2 is a vertical cross sectional view taken substantially on the line 2—2 of FIGURE 1.

Referring to the drawings, and more particularly to FIGURES 1 to 5, 11 designates the supporting frame of a vehicle, and 12 designates an automotive differential of conventional design, driven by a propeller shaft 13 and having output shafts 14, 14 which are connected by respective universal joints 15, 15 to telescoping shaft assemblies 16 16 each shaft assembly comprising a squared inner shaft element which is telescopically received in a square outer sleeve element. The ends of the outer sleeve elements of the respective telescoping shaft assemblies 16, 16 are connected by respective universal joints 17, 17 to respective shafts 19, each forming part of a shock absorbing assembly 18. The shock absorbing assemblies 18 are of identical construction, so that the description will be confined to only one of said assemblies.

Shaft 19 is journaled in a sleeve 20 which is in turn journaled in a portion of the supporting frame 11, and which also extends through and is secured in the two legs 21, 21 of a pivoting link member 22. The link member 22 is formed at its upper portion with an outwardly extending axle 23 on which is journaled the wheel 24, suitable bearings 47, 47 being provided between the hub of the wheel and the axle 23, whereby the wheel is freely rotatable on said axle.

The pivoting link member 22 is also formed with an inwardly extending long arm 40 which is connected at its inner end by a ball joint assembly 25 to a stationary frame member 26, which is a part of the supporting frame 11. Mounted on the arm 40 of the pivoting link member 22 is a stabilizer assembly, designated generally at 27, comprising two concentric helical springs 28 and 29 and two end plates 30 and 31. As shown in detail in FIGURE 5, spring 28 is the smaller in diameter and it fits inside the spring 29. The springs are each provided with two end lugs 32, 33 and 32', 33', each of which is parallel to the axis of its respective spring. The lugs 33, 33' engage in holes 34, 34' provided in end plate 30, said end plate 30 being fastened to the stationary frame member 26. Lugs 32, 32' engage in arcuate slots 35, 35' provided in end plate 31, said end plate 31 being welded to the arm 40. The slots 35, 35' are concentric with the axis of arm 40 and subtend angles of at least 90 degrees on the circular end plate 31. The arcuate slots 35, 35' are located in adjacent quadrants of the end plate 31, and the inner slot 35' has a radius corresponding to the radial distance of the lug 32' from the axis of arm 40, whereas the lug 32 is at a radial distance corresponding to the radius of the outer arcuate slot 35. Thus, the stabilizer assembly 27 is arranged in such a manner that pivoting link member 22 is allowed to rotate 90 degrees to either side of the vertical, but by the engagement of the lugs 32, 32' in the slots 35, 35' and of the lugs 33, 33' in the holes 34, 34', the stabilizer assembly 27 exerts biasing torque on pivoting link member 22 urging it to return to its vertical position.

Secured inside the rim 36 of wheel 24 is an internal ring gear 37 which is rigidly connected to the wheel hub 38. The ring gear 37 engages with a pinion gear 39 secured on the end of the shaft 19.

Joint 25 and sleeve 20 are both on the same horizontal axis. They are held in position by the frame 11, of which stationary member 26 is an extension. Pivoting link member 22 is free to rotate about the axis defined by sleeve 20 and joint 25. Pivoting link member 22 is yieldably restricted in its rotation by the action of the stabilizer 27.

Referring to FIGURE 6, an obstacle 43 in the path of wheel 24 causes wheel 24 to be displaced from its course.

The path of the axle 23 of wheel 24 is designated at 41. By the action of the shock absorber assembly 18, the link member 22 is caused to swing back and forth about the axis of shaft 19, giving the path of the shaft 19, and consequently the frame 11 of the vehicle, the form shown at 42. The path of travel 42 of the frame 11 is considerably smoother than that of the wheel 24. The abrupt changes in direction included in the path 41 are cushioned by the action of the shock absorber assembly 18.

Referring now to the form of the invention shown in FIGURES 7 to 10, 18' generally designates a modified form of shock absorber assembly. The axle 19' extends directly from the conventional automotive differential 12, and is covered over its entire length by the cylindrical housing portion 44. The frame 11 of the vehicle is supported on the cylindrical axle housing elements 44, 44.

A pinion gear 39' is integrally formed at the outer end of each axle 19', and engages with an internal ring gear 37', which is formed as a part of hub 38' of the associated wheel rim 36. The associated wheel rotates on axle 23', which is integrally formed with the pivoting link member 22' at the upper end of said link member, as shown in FIGURE 8. Link member 22' is provided with a cylindrically shaped sleeve section 20' which is journaled on shaft 19'. The cylindrical sleeve member 20' of the pivoting link member 22' is rotatably supported inside the cylindrical housing portion 44, and a semicylindrical locking plate 46 fitting in the correspondingly notched end of housing portion 44. As will be apparent from FIGURE 10, the semicylindrical cover segment 46 is engageable in the notched end portion of the associated cylindrical housing member 44, and the sleeve 45 is telescopically engageable thereon, to retain the member 46 in the notched end portion of the cylindrical housing member 44. Thus, the members 44 and 46 are receivable in the sleeve 45, which is secured thereover by a bolt 48 engageable through an aperture provided in one end portion of the sleeve member 45 and threadedly engageable in the member 44, to secure parts in the assembled relationship thereof shown in FIGURE 8.

Sleeve 45 is formed with an annular collar or flange 49 to which are secured the end lugs 50, 50' of concentric stabilizing springs 28', 29' disposed on the outer portion of the sleeve 45 and located between the flange 49 and the link member 22'. The end lugs 50, 50' extend inwardly of the vehicle parallel to the axis of the springs. The springs 28', 29' are provided at their outer ends with the outwardly projecting lugs 51, 51' which engage in respective arcuate grooves 60, 60' formed in the member 22' concentrically with the axis of the shaft 19', and which subtend angles of at least 90 degrees, preferably angles of slightly more than 90 degrees, as shown in FIGURE 9, and which are arranged in adjacent quadrants on member 22' around the axis of shaft 19', as shown in FIGURE 9. The end lugs 50, 50' are suitably secured in the flange 49 so as to be substantially fixed relative to the associated cylindrical housing member 44.

It will be apparent from the above description that the stabilizer assembly 27' is arranged in such a manner that the pivoting link member 22' is allowed to rotate on the axis defined by shaft 19' 90 degrees to either side of the vertical (namely, a vertical plane containing the axes of shaft 19' and axle 23'), but the stabilizer assembly 27' exerts biasing torque on the pivoting link member 22' urging it to return to the vertical position. This biasing torque is developed because of the fact that in the normal position of the parts, the lug 51 engages the left end of the upper groove 60 and the lug 51' engages the left end of the lower groove 60', as shown in FIGURE 9. Clockwise rotation of the member 22', as viewed in FIGURE 9, is resiliently opposed by the helically wound torsion spring 28', whereas counterclockwise rotation of the member 22' is resiliently opposed by the outer helically wound torsion spring 29'. The wheel 24 may be driven by shaft 19' in any position of the pivoting link member 22'.

The action of the shock absorber assembly 18' is similar to that diagrammatically illustrated in FIGURE 6. In FIGURE 6 the path of the axle 23' is designated by the trace 41, whereas the path of the shaft 19', the cylindrical housing portion 44 and consequently, the frame 11 of the vehicle, is designated by the trace 42.

As will appear from FIGURE 8, the sleeve member 20' is positively restrained against endwise movement by the provision of an inwardly projecting integral rib 62 provided on the end portion of housing member 44 and a similar inwardly projecting rib 63 provided on the cover segment 46, said ribs 62 and 63 engaging in the respective end portions of an annular peripheral groove 64 formed in the sleeve element 20'.

Referring now to the form of the invention illustrated in FIGURES 11 to 14, the reference numeral 118 designates generally said modified form of the shock absorbing assembly. Extending directly from the conventional automotive differential 12 is an axle 119, which is provided at its end with pinion gear 139, which engages with internal ring gear 137, which is in turn integrally formed as a part of the hub 138 of wheel rim 36. Wheel 24 rotates on axle 123, which is an arm of the pivoting link member 122. Axle 119 is provided with a collar 52, and the respective ball bearing assemblies 53, 53 are provided on opposite sides of collar 52 in the cylindrical bearing recess 69 provided in member 122. Thus, the pivoting link member 122 is journaled on the bearings 53, 53. The collar 52 is secured to shaft 119 by a set screw 54, and an aperture 55 is provided in the top wall of the link member 122 to provide access to said set screw.

Link member 122 is also provided with a depending projection 56 on the opposite sides of which are positioned respective rubber stops 57, 57, said stops being integrally connected by a neck portion 70 which extends through a transverse aperture provided in the projection 56. The rubber stop members 57, 57 are engageable with the respective ends of a stop bracket 58 upon rotation of pivoting link member 122. Stop bracket 58 is fastened to the frame 11 by means of bolts 59.

As shown in FIGURE 13, the stop bracket 58 is formed at its opposite ends with the recesses 71, 71 in which the respective stop members 57, 57 are receivable, the recesses serving to confine said stop members when they are compressed, whereby to cushion the swinging movement of the link member 122 at the extreme limit of swinging movement thereof.

With the arrangement illustrated in FIGURES 11 to 14, the pivoting link member 122 is allowed to swing about the axis of shaft 119, relative to the frame 11, approximately 90 degrees to either side of the vertical, but its rotation is limited by the action of the stop members 57 cooperating with the recesses 71 in the bracket member 58, as above described. The pivoting link member 122 swings freely relative to shaft 119 and its collar 52. The action of the shock absorbing assembly 118 is generally similar to that of the previously described forms of the invention and the resultant effects can be illustrated by reference to FIGURE 6, wherein the trace 41 represents the path of movement of the axle 123, and the trace 42 represents the path of movement of the shaft 119, the cylindrical housing member 44', and the frame 11 of the vehicle, attached to said housing member.

While certain specific embodiments of an improved shock absorbing assembly to be employed between a frame and a driven load-supporting wheel associated with said frame have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a frame, a rotating drive shaft extending from said frame, a supporting wheel, an internal ring gear concentrically mounted on said wheel, a pinion gear on said shaft, means on the frame rotatably supporting said shaft with said pinion gear in meshing engagement with said ring gear, link means journaled axially to and depending from said wheel and pivotally connected to said shaft and to said frame, whereby the frame is supported from the wheel through said link means, and whereby the link means may swing while the wheel is being driven by said drive shaft, and resilient means limiting swinging movement of said link means, said resilient means comprising a pair of concentrically mounted torsion springs, said torsion springs being each connected at one end to the frame, said link means being formed with arcuate recesses located to slidably receive the opposite ends of said torsion springs, at least one of said opposite ends of the springs being at times engageable with an end of one of said arcuate recesses, whereby to stress at least one of said springs when the link means swings in either direction from a vertical position.

2. In a vehicle, a frame, a shaft housing on the frame, a rotating drive shaft extending through said housing, a supporting wheel, an internal ring gear concentrically mounted on said wheel, a pinion gear on said shaft, means in the housing rotatably supporting said shaft with said pinion gear in meshing engagement with said ring gear, link means journaled axially to and depending from said wheel and pivotally connected to said shaft to said frame, whereby the frame is supported from the wheel through said link means, and whereby the link means may swing while the wheel is being driven by said drive shaft, and resilient means limiting swinging movement of said link means, said resilient means comprising a pair of concentrically mounted torsion springs, said torsion springs being each connected at one end to the housing, said link means being formed with arcuate recesses located to slidably receive the opposite ends of said torsion springs, at least one of said opposite ends of the springs being at times engageable with an end of one of said arcuate recesses, whereby to stress at least one of said springs when the link means swings in either direction from a vertical position.

3. In a vehicle, a frame, a rotating drive shaft extending from said frame, a supporting wheel, an internal ring gear concentrically mounted on said wheel, a pinion gear on said shaft, means on the frame rotatably supporting said shaft with said pinion gear in meshing engagement with said ring gear, suspension link means journaled at its top end axially to and depending from said wheel and pivotally connected at its bottom end to said frame in load-bearing relationship thereto and concentrically with the axis of said shaft, whereby the frame is supported from the wheel through said link means, and whereby the link means may swing while the wheel is being driven by said drive shaft, said link means including an inwardly extending arm pivotally connected to said frame on an axis aligned with the axis of said pinion gear, and resilient means limiting swinging movement of said link means, said resilient means comprising at least one torsion spring surrounding said arm and connected between said frame and said arm.

References Cited in the file of this patent

UNITED STATES PATENTS

| | | |
|---|---|---|
| 684,189 | Byers | Oct. 8, 1901 |
| 1,401,043 | Church | Dec. 20, 1921 |

FOREIGN PATENTS

| | | |
|---|---|---|
| 230,265 | Great Britain | Mar. 12, 1925 |
| 579,110 | France | July 23, 1924 |